US009155003B2

(12) United States Patent
Mutikainen et al.

(10) Patent No.: US 9,155,003 B2
(45) Date of Patent: Oct. 6, 2015

(54) SYSTEMS, METHODS, APPARATUSES, AND COMPUTER PROGRAM PRODUCTS FOR FACILITATING VOICE CALL CONTINUITY IN INTERSYSTEM HANDOVER

(75) Inventors: Jari Mutikainen, Lepsama (FI); Curt Wong, Sammamish, WA (US)

(73) Assignee: Nokia Technologies Oy, Espoo (FI)

( * ) Notice: Subject to any disclaimer, the term of this patent is extended or adjusted under 35 U.S.C. 154(b) by 175 days.

(21) Appl. No.: 13/260,083

(22) PCT Filed: Mar. 23, 2009

(86) PCT No.: PCT/IB2009/051210
§ 371 (c)(1),
(2), (4) Date: Sep. 23, 2011

(87) PCT Pub. No.: WO2010/109269
PCT Pub. Date: Sep. 30, 2010

(65) Prior Publication Data
US 2012/0014356 A1    Jan. 19, 2012

(51) Int. Cl.
*H04L 12/66* (2006.01)
*H04W 36/00* (2009.01)

(52) U.S. Cl.
CPC .................................. *H04W 36/0022* (2013.01)

(58) Field of Classification Search
USPC ......... 370/229–231, 235, 236, 241, 248, 252, 370/351–356, 912; 455/403, 422.1, 436, 455/439, 442
See application file for complete search history.

(56) References Cited

U.S. PATENT DOCUMENTS

2006/0136557 A1*  6/2006  Schaedler et al. ............ 709/203
2009/0147754 A1*  6/2009  Long et al. .................... 370/331

FOREIGN PATENT DOCUMENTS

| CN | 101204026 A | 6/2008 |
|---|---|---|
| CN | 101208970 A | 6/2008 |
| EP | 1677562 A | 7/2006 |
| EP | 2083576 A | 7/2009 |
| WO | 2006112561 A | 10/2006 |
| WO | 2006125085 A | 11/2006 |
| WO | 2008034385 A | 3/2008 |
| WO | WO 2008034835 A1 * | 3/2008 |
| WO | 2008059570 A | 5/2008 |
| WO | WO-2008059570 A1 | 5/2008 |

OTHER PUBLICATIONS

3GPP SA WG2: Voice Call Continuity between CS and IMS Study (3GPP TR 23.806 version 7.0.0 Release 7) Dec. 1, 2005.*

(Continued)

*Primary Examiner* — Omar Ghowrwal
(74) *Attorney, Agent, or Firm* — Mintz Levin Cohn Ferris Glovsky and Popeo, P.C.

(57) ABSTRACT

Systems, methods, apparatuses, and computer program products are provided for facilitating voice call continuity in intersystem handover. A method may include determining that a user equipment device being handed over from a packet switched network to a circuit switched network is a party to a voice call in an alerting state. The method may further include providing session state information indicating that the user equipment device is a party to a voice call in an alerting state to a network entity on the circuit switched network in response to the determination. Corresponding systems, computer program products and apparatuses are also provided.

9 Claims, 7 Drawing Sheets

(56) References Cited

OTHER PUBLICATIONS

3GPP TR 23.838 v0.4.0 (Feb. 2009), 3rd Generation Partnership Project; Technical Specification Group Services and Architecture; IMS Service Continuity enhancements: Servive, Policy and Interactions; Stage 2 (Release 9), pp. 1-44.*

International Search Report and Written Opinion of the International Searching Authority for Patent Cooperation Treaty Application No. PCT/IB2009/051210, dated Dec. 22, 2009, 17 pages.

3GPP TS 23.216 V0.1.0 (Jan. 2008); Technical Specification 3rd Generation Partnership Project; Technical Specification Group Services and System Aspects; Single Radio Voice Call Continuity (SRVCC); Stage 2 (Release 8).

3GPP TS 23.237 V9.0.0 (Mar. 2009) Technical Specification 3rd Generation Partnership Project; Technical Specification Group Services and Architecture; IP Multimedia Subsystem (IMS) Service Continuity; Stage 2 (Release 9).

3GPP TS 24.008 V8.0.0 (Dec. 2007) Technical Specification 3rd Generation Partnership Project; Technical Specification Group Core Network and Terminals; Mobile radio interface Layer 3 specification; Core network protocols; Stage 3 (Release 8).

3GPP TR 23.838 V9.0.0 (Jun. 2009) Technical Report 3rd Generation Partnership Project; Technical Specification Group Services and System Aspects; IP Multimedia Subsystem (IMS) service continuity enhancements; Service, policy and interaction; Stage 2 (Release 9).

Ericsson, "Clarification on transaction identifiers in Alternative 1—support of mid-call services", 3GPP TSG SA WG2 Meeting #71 TD S2-091387, Feb. 2009, Budapest, Hungary.

* cited by examiner

SYSTEMS, METHODS, APPARATUSES, AND COMPUTER PROGRAM PRODUCTS FOR FACILITATING VOICE CALL CONTINUITY IN INTERSYSTEM HANDOVER

RELATED APPLICATION

This application was originally filed as PCT Application No. PCT/IB2009/051210, filed Mar. 23, 2009.

TECHNOLOGICAL FIELD

Embodiments of the present invention relate generally to communication technology and, more particularly, relate to systems, methods, apparatuses, and computer program products for facilitating voice call continuity in intersystem handover.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

However, coverage by these new networking technologies, which may comprise packet switched networks (e.g., an Internet Protocol (IP) Multimedia Subsystem (IMS) capable network), may not be universal as they are deployed. Thus, in order to assure quality of service and avoid dropping of calls, the new networking technologies may have to coexist with legacy networking technologies, such as circuit switched (CS) networks. In this regard, a mobile terminal may have to be handed over between, for example, an LTE network and a CS network. Single radio voice call continuity (SR-VCC) procedures are being defined to enable a mobile terminal to perform an inter-domain handover from LTE to CS such that a voice over internet protocol (VoIP) session over IMS over the LTE access may be transferred to the CS network, when the LTE coverage is lost.

Heretofore, however, procedures have only been defined that may facilitate SR-VCC in an inter-domain handover for active calls. No procedures have been defined for facilitating SR-VCC in inter-domain handovers between a PS network and a CS network when a voice call is in an alerting state. In this regard, a voice call in an alerting state is an unanswered phone call, such as a ringing phone call. Accordingly, under current procedures, when SR-VCC in an inter-domain handover occurs in an alerting state call, the call may be dropped. This may pose a major inconvenience to users, as the alerting state may typically last upwards of several tens of seconds before the call is answered. For example, assume a typical call in the alerting phase lasts approximately 20 seconds and an ensuing conversation (e.g., the active phase) between parties of a voice call lasts 70 seconds. Further, setup and release phases for the voice call may last approximately 10 seconds. Therefore, since an average voice call including setup, alerting, conversation, and release phases may last 100 seconds and 20 seconds of that is the alerting state, 20 percent of all SR-VCC occurrences may occur in the alerting phase.

Systems, methods, apparatuses, and computer program products for facilitating voice call continuity in intersystem handover are therefore provided herein that may address at least some of the deficiencies described above.

BRIEF SUMMARY OF SOME EXAMPLES OF THE INVENTION

Methods, apparatuses, and computer program products are therefore provided for facilitating voice call continuity in intersystem handover. In this regard, methods, apparatuses, and computer program products are provided that may provide several advantages to computing devices, computing device users, and network service providers. Embodiments of the invention provide for SR-VCC in an intersystem handover of a user equipment device that is a party to a voice call in the alerting state. In this regard, embodiments of the invention provide for detection that a user equipment device is a party to an alerting state voice call at a network entity of a packet switched network when the user equipment device is handed over from the packet switched network to a circuit switched network. Embodiments of the invention further provide for the network entity of the packet switched network to provide notification to a network entity of the circuit switched network of the voice call in the alerting state so that the network entity of the circuit switched network is enabled to create an appropriate circuit switched call state. In this regard, embodiments of the invention provide for SR-VCC in an intersystem handover of a user equipment device that is a party to a voice call in the alerting state such that the voice call is not dropped as a result of the handover.

In a first exemplary embodiment, a method is provided, which includes determining that a user equipment device being handed over from a packet switched network to a circuit switched network is a party to a voice call in an alerting state. The method of this embodiment further includes providing session state information indicating that the user equipment device is a party to a voice call in an alerting state to a network entity on the circuit switched network in response to the determination.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for determining that a user equipment device being handed over from a packet switched network to a circuit switched network is a party to a voice call in an alerting state. The second program instruction of this embodiment is for causing session state information indicating that the user equipment device is a party to a voice call in an alerting state to be provided to a network entity on the circuit switched network in response to the determination.

In another exemplary embodiment, an apparatus is provided. The apparatus of this embodiment includes a processor and a memory storing executable instructions that when executed by the processor cause the apparatus to determine that a user equipment device being handed over from a packet switched network to a circuit switched network is a party to a voice call in an alerting state. The executable instructions of this embodiment when executed further cause the apparatus to provide session state information indicating that the user equipment device is a party to a voice call in an alerting state to a network entity on the circuit switched network in response to the determination.

In another exemplary embodiment, an apparatus is provided, which includes means for determining that a user equipment device being handed over from a packet switched network to a circuit switched network is a party to a voice call in an alerting state. The apparatus of this embodiment further includes means for providing session state information indicating that the user equipment device is a party to a voice call in an alerting state to a network entity on the circuit switched network in response to the determination.

In another exemplary embodiment, a method is provided, which includes receiving session state information sent by a network entity on an internet protocol multimedia subsystem. The session state information of this embodiment indicates that a user equipment device being handed over from a packet switched network to a circuit switched network is a party to a voice call in an alerting state. The method of this embodiment further includes creating a corresponding circuit switched call control state based at least in part upon the received session state information.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for causing session state information sent by a network entity on an internet protocol multimedia subsystem to be received. The session state information of this embodiment indicates that a user equipment device being handed over from a packet switched network to a circuit switched network is a party to a voice call in an alerting state. The second program instruction of this embodiment is for creating a corresponding circuit switched call control state based at least in part upon the received session state information.

In another exemplary embodiment, an apparatus is provided. The apparatus of this embodiment includes a processor and a memory storing executable instructions that when executed by the processor cause the apparatus to receive session state information sent by a network entity on an internet protocol multimedia subsystem. The session state information of this embodiment indicates that a user equipment device being handed over from a packet switched network to a circuit switched network is a party to a voice call in an alerting state. The executable instructions of this embodiment when executed further cause the apparatus to create a corresponding circuit switched call control state based at least in part upon the received session state information.

In another exemplary embodiment, an apparatus is provided, which includes means for receiving session state information sent by a network entity on an internet protocol multimedia system. The session state information of this embodiment indicates that a user equipment device being handed over from a packet switched network to a circuit switched network is a party to a voice call in an alerting state. The apparatus of this embodiment further includes means for creating a corresponding circuit switched call control state based at least in part upon the received session state information.

In another exemplary embodiment, a method is provided, which includes receiving a handover command for a single radio voice call continuity handover of a user equipment device that is a party to a voice call in an alerting state from a packet switched network to a circuit switched network. The method of this embodiment further includes creating, in response to receipt of the handover command, a circuit switched call control state.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is for causing a handover command for a single radio voice call continuity handover of a user equipment device that is a party to a voice call in an alerting state from a packet switched network to a circuit switched network to be received. The second program instruction of this embodiment is for creating, in response to receipt of the handover command, a circuit switched call control state.

In another exemplary embodiment, an apparatus is provided. The apparatus of this embodiment includes a processor and a memory storing executable instructions that when executed by the processor cause the apparatus to receive a handover command for a single radio voice call continuity handover of the apparatus from a packet switched network to a circuit switched network. The apparatus of this embodiment is a party to a voice call in an alerting state when the handover command is received. The executable instructions of this embodiment when executed further cause the apparatus to create, in response to receipt of the handover command, a circuit switched call control state.

In another exemplary embodiment, an apparatus is provided, which includes means for receiving a handover command for a single radio voice call continuity handover of the apparatus from a packet switched network to a circuit switched network. The apparatus of this embodiment is a party to a voice call in an alerting state when the handover command is received. The apparatus of this embodiment further includes means for creating, in response to receipt of the handover command, a circuit switched call control state.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

Figure 1:
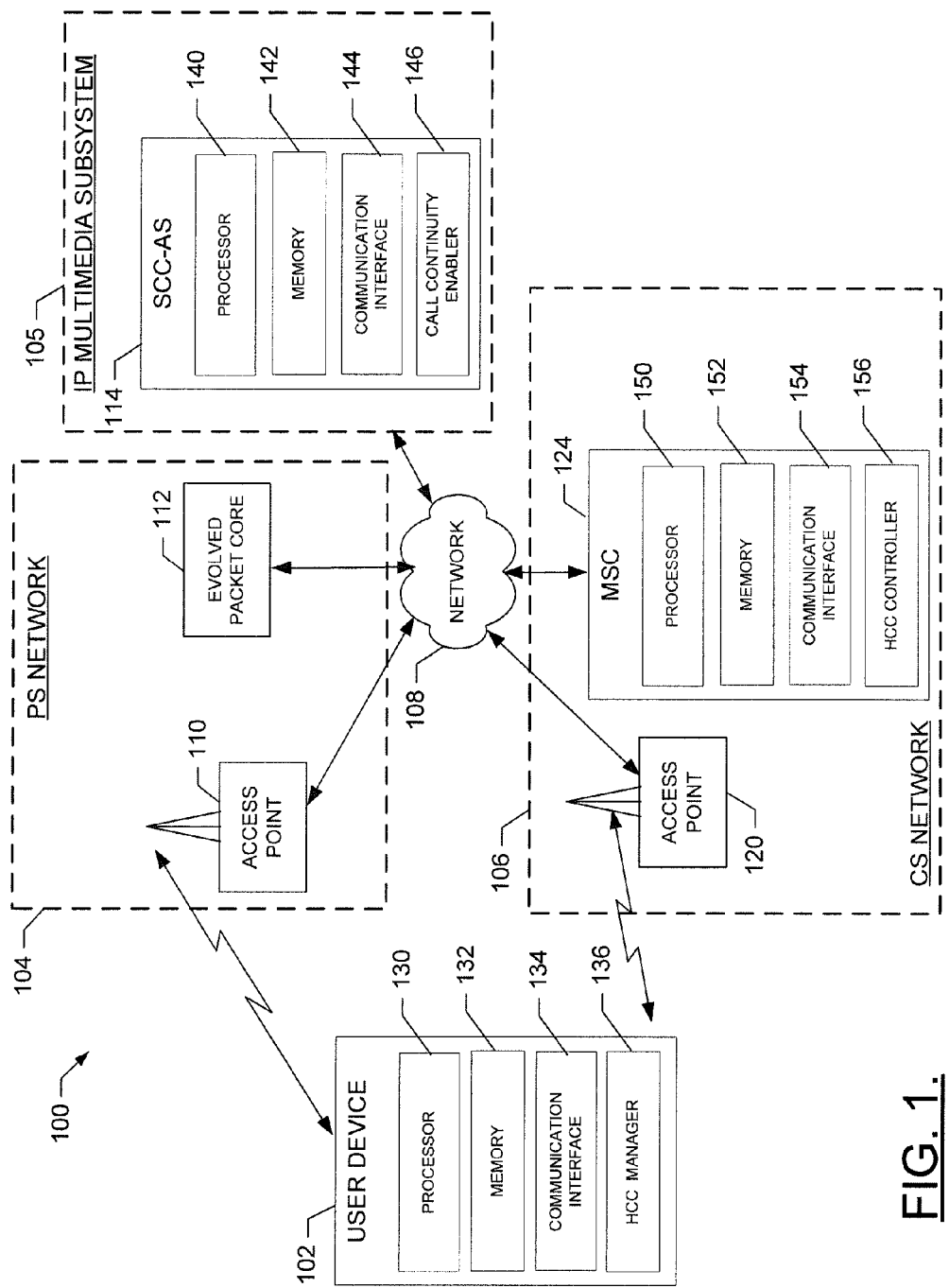
FIG. 1 illustrates a system for facilitating voice call continuity in intersystem handover according to an exemplary embodiment of the present invention.
Figure 3:
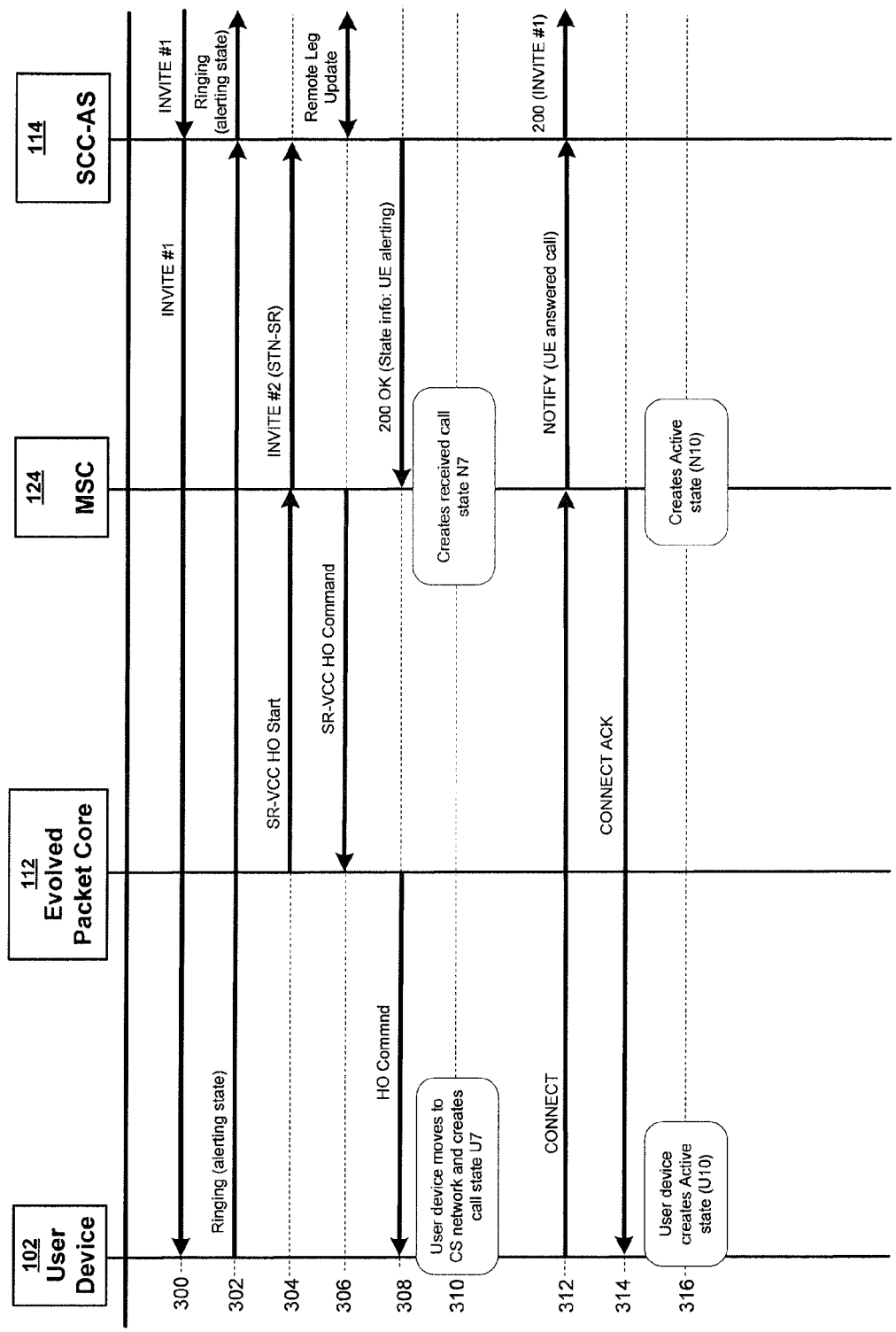
Figure 4:
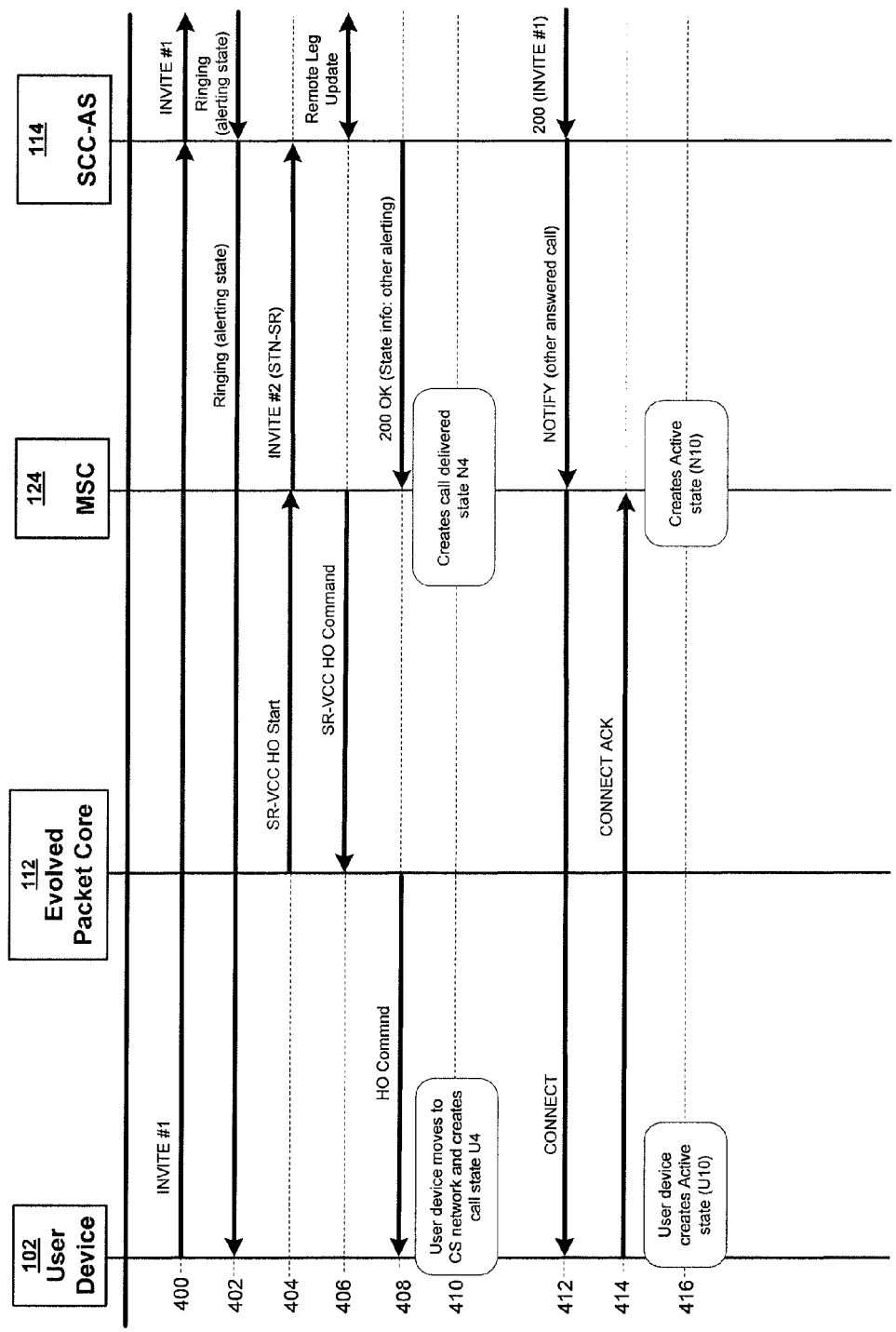
Figure 5:
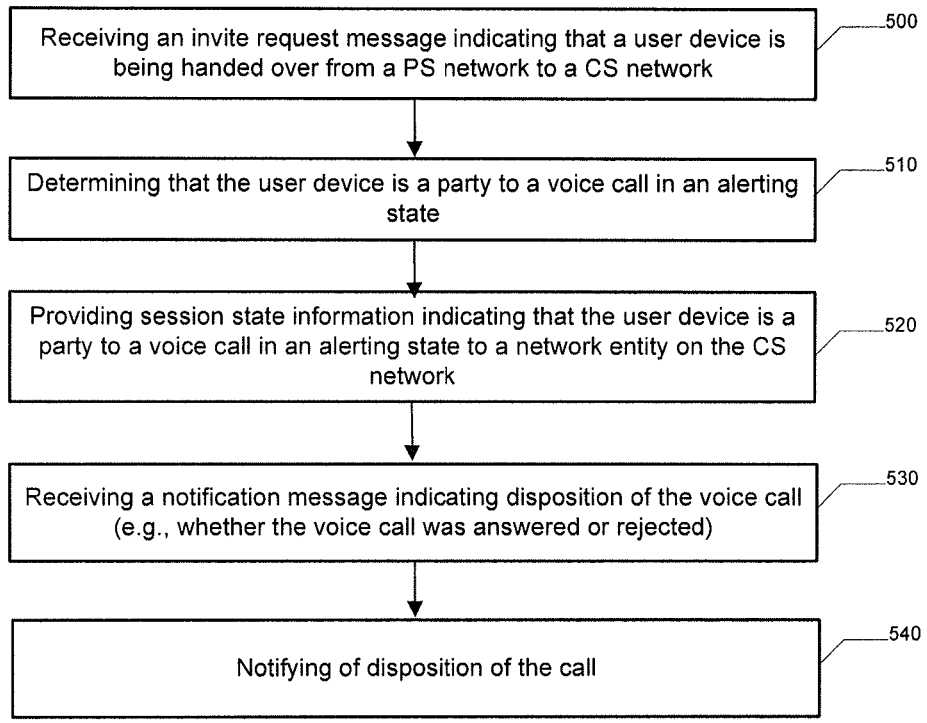
Figure 6:
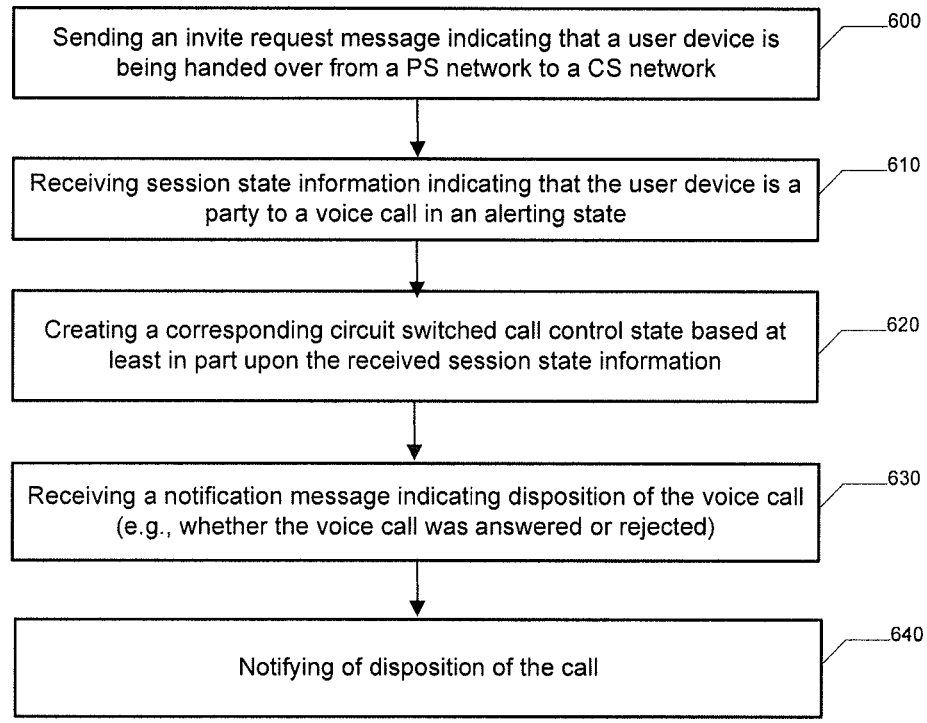
Figure 7:
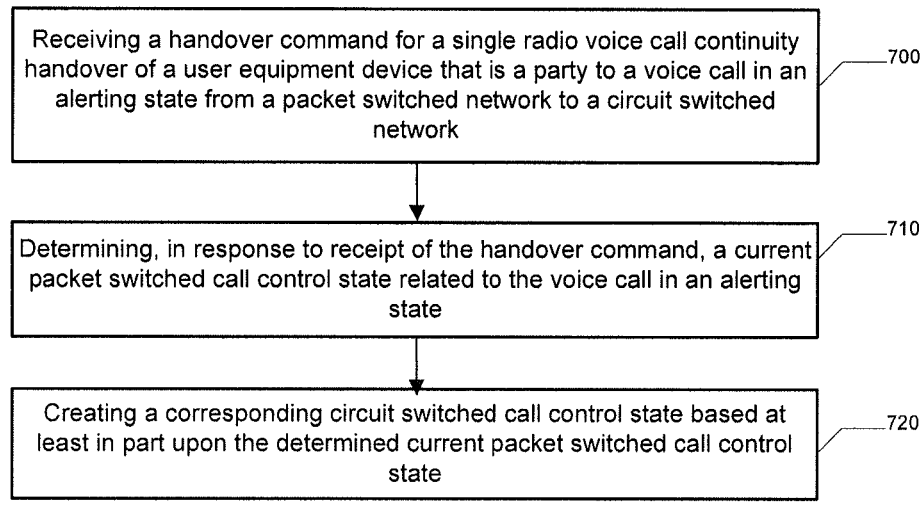

FIGS. 3-4 illustrate signaling diagrams of signals that may be exchanged between entities of the system of FIG. 1 for facilitating voice call continuity in intersystem handover according to exemplary embodiments of the present invention; and FIGS. 5-7 illustrate flowcharts according to exemplary methods for facilitating voice call continuity in intersystem handover according to exemplary embodiments of the invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for facilitating voice call continuity in intersystem handover according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for facilitating voice call continuity in intersystem handover, numerous other configurations may also be used to implement embodiments of the present invention. Further, it will be appreciated that where references herein are made to specific types of communications networks (e.g., LTE, Global System for Mobile Communications Edge Radio Access Network (GERAN), and/or the like) and specific terminology for system entities, it will be appreciated that embodiments of the invention are applicable to communications networks not using standards of the referenced network(s) and to system entities performing similar functions to those described herein, but which are referred to using different terminology in accordance with other network standards.

In at least some embodiments, the system 100 includes a user device 102, a packet switched (PS) network 104, an IP Multimedia Subsystem (IMS) 105, and a circuit switched (CS) network 106, which may be configured to communicate over the network 108. The PS network 104 may comprise any packet switched public land mobile network. In an exemplary embodiment, the PS network 104 comprises a network operating in accordance with LTE standards. The CS network 106 may comprise any circuit switched public land mobile network, such as, for example, a GERAN network, UMTS Terrestrial Radio Access Network (UTRAN), and/or the like. The network 108 may comprise one or more wired networks, one or more wireless networks, or a combination thereof. In some embodiments, the network 108 comprises the Internet.

The PS network 104 may comprise an access point 110, evolved packet core 112. The access point 110 may comprise a base station or other entity configured to provide radio access to the user device 102 such that the user device 102 may access the PS network 104. The evolved packet core 112 may comprise, for example, a mobility management entity (MME), serving gateway (S-GW), packet data node (PDN) gateway (P-GW), and/or other entities, which may provide a network architecture for managing the PS network 104.

The IMS 105 may comprise a service centralization and continuity application server (SCC-AS) 114. The SCC-AS 114 may comprise one or more computing devices comprising a network entity configured to provide voice call and/or data continuity services for user devices 102. In this regard, although referred to as an SCC-AS, the SCC-AS 114 may comprise any network entity configured to provide at least some of the functionality herein attributed to the SCC-AS.

The CS network 106 may comprise an access point 120 and/or a mobile switching center (MSC) 124. The access point 120 may comprise a base station or other entity configured to provide radio access to the user device 102 such that the user device 102 may access the CS network 106. The MSC 124 may comprise one or more computing devices comprising a network entity configured to manage switching to facilitate voice calls and/or data transfer within the CS network 106.

The user device 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to access the PS network 104, CS network 106, and/or network 108 through radio signals exchanged with access points 110 and 120. In some embodiments, the user device 102 comprises a user equipment device (UE), which may be configured to access the PS network 104 in accordance with LTE standards. In an exemplary embodiment, a user device 102 is embodied as a mobile terminal, such as that illustrated in FIG. 2.

Figure 2:
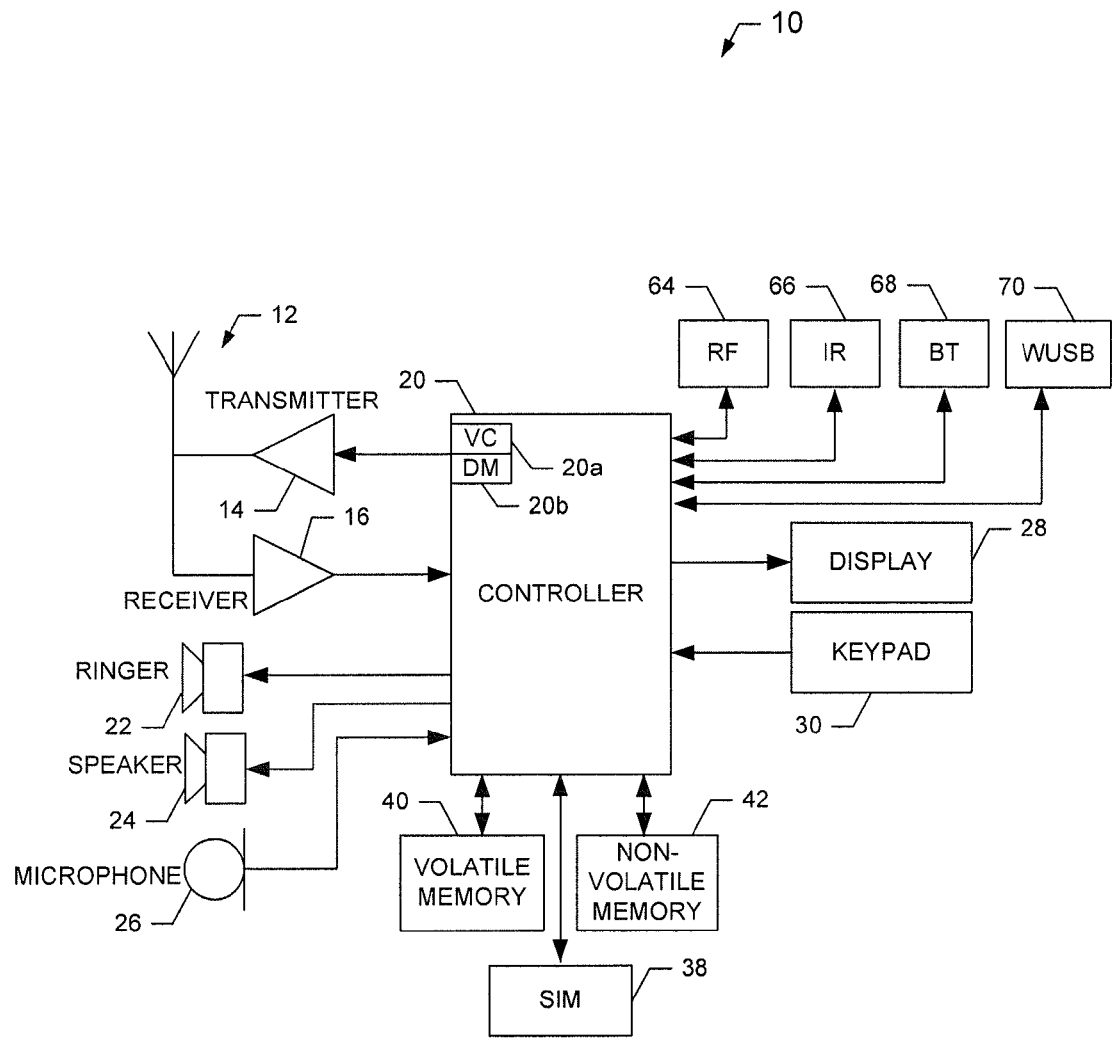
FIG. 2 is a schematic block diagram of a mobile terminal according to an exemplary embodiment of the present invention.

In this regard, FIG. 2 illustrates a block diagram of a mobile terminal 10 representative of one embodiment of a user device 102 in accordance with embodiments of the present invention. It should be understood, however, that the mobile terminal 10 illustrated and hereinafter described is merely illustrative of one type of user device 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, IMS communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an exemplary embodiment, the user device 102 includes various means, such as a processor 130, memory 132, communication interface 134, and a handover and call control (HCC) manager 136 for performing the various functions herein described. These means of user device 102 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 132) that is executable by a suitably configured processing device (e.g., the processor 130), or some combination thereof.

The processor 130 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 130 comprises a plurality of processors. The plurality of processors may be in operative communication with each other and may be collectively configured to perform one or more functionalities of the user device 102 as described herein. In embodiments wherein the user device 102 is embodied as a mobile terminal 10, the processor 130 may be embodied as and/or comprise the controller 20. In an exemplary embodiment, the processor 130 is configured to execute instructions stored in the memory 132 or otherwise accessible to the processor 120. These instructions, when executed by the processor 130, may cause the user device 102 to perform one or more of the functionalities of the user device 102 as described herein. As such, whether configured by hardware or software methods, or by a combination thereof, the processor 130 may represent an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, the instructions may specifically configure the processor 130 to perform one or more algorithms and operations described herein.

The memory 132 may include, for example, volatile and/or non-volatile memory. Although illustrated in FIG. 1 as a single memory, the memory 132 may comprise a plurality of memories. The memory 132 may comprise volatile memory, non-volatile memory, or some combination thereof. In this regard, the memory 132 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 132 may be configured to store information, data, applications, instructions, or the like for enabling the user device 102 to carry out various functions in accordance with exemplary embodiments of the present invention. For example, in at least some embodiments, the memory 132 is configured to buffer input data for processing by the processor 130. Additionally or alternatively, in at least some embodiments, the memory 132 is configured to store program instructions for execution by the processor 130. The memory 132 may store information in the form of static and/or dynamic information. This stored information may be stored and/or used by the HCC manager 136 during the course of performing its functionalities.

The communication interface 134 may be embodied as any device or means embodied in hardware, a computer program product comprising computer readable program instructions stored on a computer readable medium (e.g., the memory 132) and executed by a processing device (e.g., the processor 130), or a combination thereof that is configured to receive and/or transmit data from/to a remote device over the PS network 104, IMS 105, CS network 106, and/or network 108. In at least one embodiment, the communication interface 134 is at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with other entities of the system 100. The communication interface 134 may be configured to receive and/or transmit data using any protocol that may be used for communications between computing devices of the system 100. The communication interface 134 may additionally be in communication with the memory 132 and/or HCC manager 136, such as via a bus.

The HCC manager 136 may be embodied as various means, such as hardware, a computer program product comprising computer readable program instructions stored on a computer readable medium (e.g., the memory 132) and executed by a processing device (e.g., the processor 130), or some combination thereof and, in one embodiment, is embodied as or otherwise controlled by the processor 130. In embodiments where the HCC manager 136 is embodied separately from the processor 130, the HCC manager 136 may be in communication with the processor 130. The HCC manager 136 may further be in communication with the memory 132 and/or communication interface 134, such as via a bus.

In an exemplary embodiment, the SCC-AS 114 includes various means, such as a processor 140, memory 142, communication interface 144, and call continuity enabler 146 for performing the various functions herein described. These means of the SCC-AS 114 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 142) that is executable by a suitably configured processing device (e.g., the processor 140), or some combination thereof.

The processor 140 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 140 comprises a plurality of processors. The plurality of processors may be embodied on a single computing device or distributed among a plurality of computing devices. The plurality of processors may be in operative communication with each other and may be collectively configured to perform one or more functionalities of the SCC-AS 114 as described herein. In an exemplary embodiment, the processor 140 is configured to execute instructions stored in the memory 142 or otherwise accessible to the processor 140. These instructions, when executed by the processor 140, may cause the SCC-AS 114 to perform one or more of the functionalities of the SCC-AS 114 as described herein. As such, whether configured by hardware or software methods, or by a combination thereof, the processor 140 may represent an entity capable of performing operations according to embodiments of the present invention while configured accordingly. Thus, for example, when the processor 140 is embodied as an ASIC, FPGA or the like, the processor 140 may comprise specifically configured hardware for conducting one or more operations described herein. Alternatively, as another example, when the processor 140 is embodied as an executor of instructions, the instructions may specifically configure the processor 140 to perform one or more algorithms and operations described herein.

The memory 142 may include, for example, volatile and/or non-volatile memory. Although illustrated in FIG. 1 as a single memory, the memory 142 may comprise a plurality of memories. The memory 142 may comprise volatile memory, non-volatile memory, or some combination thereof. In this regard, the memory 142 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 142 may be configured to store information, data, applications, instructions, or the like for enabling the SCC-AS 114 to carry out various functions in accordance with exemplary embodiments of the present invention. For example, in at least some embodiments, the memory 142 is configured to buffer input data for processing by the processor 140. Additionally or alternatively, in at least some embodiments, the memory 142 is configured to store program instructions for execution by the processor 140. The memory 142 may store information in the form of static and/or dynamic information. This stored information may be stored and/or used by the call continuity enabler 146 during the course of performing its functionalities.

The communication interface 144 may be embodied as any device or means embodied in hardware, a computer program product comprising computer readable program instructions stored on a computer readable medium (e.g., the memory 142) and executed by a processing device (e.g., the processor 140), or a combination thereof that is configured to receive and/or transmit data from/to a remote device over the PS network 104, IMS 105, CS network 106, and/or network 108. In at least one embodiment, the communication interface 144 is at least partially embodied as or otherwise controlled by the processor 140. In this regard, the communication interface 144 may be in communication with the processor 140, such as via a bus. The communication interface 144 may include, for example, an antenna, a transmitter, a receiver, a transceiver and/or supporting hardware or software for enabling communications with other entities of the system 100. The communication interface 144 may be configured to receive and/or transmit data using any protocol that may be used for communications between computing devices of the system 100. The communication interface 144 may additionally be in communication with the memory 142 and/or call continuity enabler 146, such as via a bus.

The call continuity enabler 146 may be embodied as various means, such as hardware, a computer program product comprising computer readable program instructions stored on a computer readable medium (e.g., the memory 142) and executed by a processing device (e.g., the processor 140), or some combination thereof and, in one embodiment, is embodied as or otherwise controlled by the processor 140. In embodiments where the call continuity enabler 146 is embodied separately from the processor 140, the call continuity enabler 146 may be in communication with the processor 140. The call continuity enabler 146 may further be in communication with the memory 142 and/or communication interface 144, such as via a bus.

In an exemplary embodiment, the MSC 124 includes various means, such as a processor 150, memory 152, communication interface 154 and a handover and call control (HCC) controller 156 for performing the various functions herein described. These means of the MSC 124 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 152) that is executable by a suitably configured processing device (e.g., the processor 150), or some combination thereof.

The processor 150 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 150 comprises a plurality of processors. The plurality of processors may be embodied on a single computing device or distributed among a plurality of computing devices. The plurality of processors may be in operative communication with each other and may be collectively configured to perform one or more functionalities of the MSC 124 as described herein. In an exemplary embodiment, the processor 150 is configured to execute instructions stored in the memory 152 or otherwise accessible to the processor 150. These instructions, when executed by the processor 150, may cause the MSC 124 to perform one or more of the functionalities of the MSC 124 as described herein. As such, whether configured by hardware or software methods, or by a combination thereof, the processor 150 may represent an entity capable of performing operations according to embodiments of the present invention while configured accordingly. Thus, for example, when the processor 150 is embodied as an ASIC, FPGA or the like, the processor 150 may comprise specifically configured hardware for conducting one or more operations described herein. Alternatively, as another example, when the processor 150 is embodied as an executor of instructions, the instructions may specifically configure the processor 150 to perform one or more algorithms and operations described herein.

The memory 152 may include, for example, volatile and/or non-volatile memory. Although illustrated in FIG. 1 as a single memory, the memory 152 may comprise a plurality of memories. The memory 152 may comprise volatile memory, non-volatile memory, or some combination thereof. In this regard, the memory 152 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 152 may be configured to store information, data, applications, instructions, or the like for enabling the MSC 124 to carry out various functions in accordance with exemplary embodiments of the present invention. For example, in at least some embodiments, the memory 152 is configured to buffer input data for processing by the processor 150. Additionally or alternatively, in at least some embodiments, the memory 152 is configured to store program instructions for execution by the processor 150. The memory 152 may store information in the form of static and/or dynamic information. This stored information may be stored and/or used by the HCC controller 156 during the course of performing its functionalities.

The communication interface 154 may be embodied as any device or means embodied in hardware, a computer program product comprising computer readable program instructions stored on a computer readable medium (e.g., the memory 152) and executed by a processing device (e.g., the processor 150), or a combination thereof that is configured to receive and/or transmit data from/to a remote device over the PS network 104, CS network 106, and/or network 108. In at least one embodiment, the communication interface 154 is at least partially embodied as or otherwise controlled by the processor 150. In this regard, the communication interface 154 may be in communication with the processor 150, such as via a bus. The communication interface 154 may include, for example, an antenna, a transmitter, a receiver, a transceiver and/or supporting hardware or software for enabling communications with other entities of the system 100. The communication interface 154 may be configured to receive and/or transmit data using any protocol that may be used for communications between computing devices of the system 100. The communication interface 154 may additionally be in communication with the memory 152 and/or HCC controller 156, such as via a bus.

The HCC controller 156 may be embodied as various means, such as hardware, a computer program product comprising computer program instructions stored on a computer readable medium (e.g., the memory 152) and executed by a processing device (e.g., the processor 150), or some combination thereof and, in one embodiment, is embodied as or otherwise controlled by the processor 150. In embodiments where the HCC controller 156 is embodied separately from the processor 150, the HCC controller 156 may be in communication with the processor 150. The HCC controller 156 may further be in communication with the memory 152 and/or communication interface 154, such as via a bus.

The evolved packet core 112 may be configured to determine when the user device 102 needs to be handed over from the PS network 104 to the CS network 106, such as when the user device 102 is moving out of radio signal range of the base station 110 and into the radio signal range of the base station 120. The evolved packet core 112 may be further configured to determine whether an SR-VCC handover of the user device 102 to the CS network 106 is needed, such as when the user device is a party to a voice call (e.g., an active voice call, a voice call in an alerting state, a voice call on hold, and/or the like). When the evolved packet core 112 determines that a handover or SR-VCC handover of the user device 102 is needed, the evolved packet core 112 may be configured to send a handover initiation message, such as an SR-VCC handover (HO) start message to the MSC 124.

The HCC controller 156 may be configured to receive a handover initiation message sent by the evolved packet core 112. In response to receipt of the handover initiation message, the HCC controller 156 may be configured to send an invite request message to the SCC-AS 114 so that the SCC-AS 114 may facilitate appropriate voice call continuity procedures for the handover. The invite request message may comprise an indication that the user device 102 is being handed over from the PS network 104 to the CS network 106.

The call continuity enabler 146 may be configured to receive the invite request message sent by the MSC 124. In response to receipt of the invite request message, the call continuity enabler 146 may be configured to determine whether the user device 102 being handed over is a party to a voice call in an alerting state. When the call continuity enabler 146 determines that the user device 102 is a party to a voice call in an alerting state, the call continuity enabler 146 may be configured to further determine whether and/or otherwise differentiate between when the user device 102 has an incoming voice call in an alerting state or has an outgoing voice call in an alerting state. The call continuity enabler 146 may be further configured to generate a message comprising session state information indicating that the user device 102 is a party to a voice call in an alerting state. The session state information may indicate whether the user device 102 has an outgoing or incoming voice call in an alerting state. The call continuity enabler 146 may further provide the session state information to the MSC 114 by sending the message comprising the session state information to the MSC 114. In some embodiments, the message comprising the session state information comprises a 200 okay (OK) message that includes the session state information as a parameter of the message.

The HCC controller 156 may be configured to receive the session state information provided by the SCC-AS 114. In response to receipt of the session state information, the HCC controller 156 may be configured to determine an appropriate corresponding circuit switched call control state based at least in part upon the session state information and then create the determined corresponding circuit switched call control state. For example, when the session state information indicates that the user device 102 has an incoming voice call in an alerting state, the HCC controller 156 may be configured to create the call received state (e.g., call control state "N7"). When the session state information indicates that the user device 102 has an outgoing voice call in an alerting state, the HCC controller 156 may be configured to create the call delivered state (e.g., call control state "N4"). The HCC controller 156 may be further configured to connect the appropriate media path for the user device 102, such as to facilitate connection of the voice call. When the user device 102 has an incoming voice call in an alerting state, the HCC controller 156 may be configured to cause the ring back tone of the user device 102 to be played back toward the caller (e.g., toward a remote end of the voice call that initiated the incoming voice call).

The HCC manager 136 of the user device 102 may be configured to receive a handover command sent by the evolved packet core 112. The HCC manager 136 may then be configured to move to the CS network 106, e.g., by attaching to the access point 120 in response to the handover command. The HCC manager 136 may be further configured to determine a current packet switched call control state (e.g., the current session initiation protocol (SIP) call control state) and create the corresponding circuit switched call control state. In this regard, the HCC manager 136 may be configured to create an appropriate CS call state in response to receipt of a handover command for SR-VCC while the user device 102 is a party to a voice call in an alerting phase. For example, when the user device 102 has an incoming voice call in an alerting state, the HCC manager 136 may be configured to create the call received call control state (e.g., call control state "U7") and when the user device 102 has an outgoing voice call in an alerting state, the HCC manager 136 may be configured to create the call delivered call control state (e.g., call control state "U4").

When the user device 102 has an incoming voice call in an alerting state at the time of handover, the HCC manager 136 may be configured to send an indication of whether the user of the user device 102 has answered (e.g., a connect message) or rejected (e.g., a disconnect message) the incoming voice call. The HCC controller 156 may be configured to receive the indication sent by the user device 102 and then send a notification message to the SCC-AS 114 containing the call event indicating whether the user device 102 answered or rejected the incoming voice call. The notification message may comprise, for example, a SIP dialog event package. If the user device 102 answered the incoming voice call, the notification message may include the session description protocol (SDP) answer. If the user device 102 rejected the incoming voice call, the notification message sent by the HCC controller 156 may comprise a SIP BYE message converted from a CS DISCONNECT message sent by the HCC manager 136 of the user device 102. The call continuity enabler 146 may then be configured to receive a notification message sent by the MSC 124 and in response, send a corresponding notification of whether the user device 102 answered or rejected the incoming voice call toward a remote end of the voice call (e.g., a network entity on a network managing the device which initiated the incoming voice call, the device which initiated the incoming voice call, or the like). The notification sent by the call continuity enabler 146 may, for example, be formatted in accordance with SIP.

When the user device 102 has an outgoing call in an alerting state during a handover, the call continuity enabler 146 may be configured to receive a notification message sent from a remote end of the outgoing voice call indicating whether the remote end answered or rejected the outgoing voice call. In response to receipt of the notification message, the call continuity enabler 146 may be configured to send an appropriate notification message indicating whether the outgoing voice call was answered or rejected to the MSC 124. The HCC controller 156 may be configured to receive the notification message indicating whether the outgoing voice call was answered or rejected and may in turn send a corresponding CS message indicating the call status to the user device 102.

In some embodiments, the entities of the system 100 are further configured to facilitate SR-VCC when the user device 102 is a party to a held voice call. In this regard, the call continuity enabler 146 may be configured to determine, in response to receipt of an invite request message indicating the user device 102 is being handed over, whether the user device 102 is a party to a voice call in the held state. If so, the call continuity enabler 146 may be configured to update the remote leg and generate a message comprising session state information indicating that the user device 102 is a party to a held voice call. In this regard, the remote leg may comprise a network path connecting to the remote end of the held voice call (e.g., the party to the held voice call other than the user device 102). The call continuity enabler 146 may be further configured to determine which party (e.g., the user device 102 or the remote end) to the held voice call placed the voice call on hold and include an indication of which party to the held voice call placed the voice call on hold in the session state information included in the generated message. The call continuity enabler 146 may further provide the session state information to the MSC 114 by sending the message comprising the session state information to the MSC 114. In some embodiments, the message comprising the session state information comprises a 200 okay (OK) message that includes the session state information as a parameter of the message.

When the HCC controller 156 receives session state information indicating the user device 102 is a party to a held voice call, the HCC controller 156 may be configured to create the corresponding CS Auxiliary call state for the held voice call. Meanwhile, the HCC manager 136 of the user device 102 may be configured to receive a handover command and move to the CS network 106. The HCC manager 136 may be configured to determine the current SIP call state, and in turn create the corresponding CS Auxiliary call state. When the user device 102 or the remote end resumes the call from Hold, the HCC controller 156 may be configured to send a resume indication to the SCC-AS 114. Additionally or alternatively, when the user device 102 or the remote end resumes the call from Hold, the call continuity enabler 146 may be configured to send a resume indication to the MSC 124. The resume indication may comprise a notification for a SIP dialog event package. Alternatively, the call continuity enabler 146 may be configured to determine that the remote end has put the call on hold and may send a 200 OK message to the MSC 124 in response to an invite request message indicating handover of the user device 102 and then put the call on Hold towards the user device 102. When the remote end resumes the call from Hold, the call continuity enabler 146 may be configured to send an SDP offer to the MSC 124 indicating resumption of an active state of the voice call. The HCC controller 156 may accordingly, in response, notify the user device 102 of resumption of the call from the hold state.

FIG. 3 illustrates a signaling diagram of signals that may be exchanged between entities of the system 100 for facilitating voice call continuity in intersystem handover when the user device 100 has an incoming voice call in an alerting state according to an exemplary embodiment of the present invention. Operation 300 may comprise the SCC-AS 114 receiving a first invite request message comprising an indication of a voice call to the user device 102 initiated by a remote end. Operation 300 may further comprise the SCC-AS 114 forwarding the first invite request message to the user device 102. In response to receipt of the invite request message, the user device 102 may begin ringing to alert a user of the user device 102 and also send an indication of ringing (e.g., a ring back) to the SCC-AS 114, at operation 302. Operation 302 may further comprise the SCC-AS 114 forwarding the ring back toward the remote end. Operation 304 may comprise the evolved packet core determining that an SR-VCC handover of the user device 102 is needed and then sending an SR-VCC HO Start message to the MSC 124. Operation 304 may further comprise the HCC controller 156 receiving the SR-VCC HO Start message and sending a second invite request message indicating handover of the user device 102 to the SCC-AS 114. The second invite request message may comprise a Session Transfer Number for SR-VCC (STN-SR). Operation 306 may then comprise the call continuity enabler 146 determining that the user device 102 is a party to a voice call in an alerting state and updating the remote leg (e.g., the network path connecting to the remote end) of the incoming voice call in alerting state. Operation 306 may further comprise the HCC controller 156 sending an SR-VCC HO Command message to the evolved packet core 112, though it will be appreciated that the HCC controller 156 may not send this message concurrent with the call continuity enabler 146 updating the remote leg and may indeed occur at any point subsequent to the MSC 124 receiving the SR-VCC HO Start message.

The call continuity enabler 146 may then send a 200 OK message comprising session state information indicating that the user device 102 has an incoming call in alerting state (e.g., "UE alerting") to the MSC 124, at operation 308. This session state information may describe a session related to the first invite request message. Operation 308 may further comprise the evolved packet core 112 sending a handover command to the user device 102, though it will be appreciated that timing of sending the handover command may not be concurrent with transmission of the 200 OK message and may occur at any point in time following receipt of the SR-VCC HO Command by the evolved packet core 112. Operation 310 may comprise the HCC manager 136 of the user device 102 moving to the CS network 106 and creating the call state U7. Operation 310 may further comprise the HCC controller 156 of the MSC 124 creating the call state N7 based at least in part upon the session state information included in the 200 OK message.

The user of the user device 102 may then answer the incoming voice call and operation 312 may comprise the user device 102 sending a CONNECT message indicating that the call was answered to the MSC 124. The HCC controller 156 may then send a notification message indicating the user device 102 answered the call to the SCC-AS 114 and the call continuity enabler 146 may consequently send a 200 OK message for the first invite request message toward the remote end of the voice call. The MSC 314 may then send a CONNECT ACKNOWLEDGEMENT (ACK) to the user device 102 in response to the CONNECT message, at operation 414. Operation 316 may then comprise the user device 102 creating the active call control state (e.g., call control state "U10") and the MSC 124 creating the active call control state (e.g., call control state "N10") in response to the voice call being answered.

FIG. 4 illustrates a signaling diagram of signals that may be exchanged between entities of the system 100 for facilitating voice call continuity in intersystem handover when the user device 100 has an outgoing voice call in an alerting state according to an exemplary embodiment of the present invention. Operation 400 may comprise the user device 102 sending a first invite request message comprising an indication of a voice call to a remote end initiated by the user device 102 to the SCC-AS 114. Operation 400 may further comprise the SCC-AS 114 in turn forwarding the first invite request message toward the remote leg (e.g., the network path connecting to the remote end). In response to receipt of the first invite request message, the remote end or other network entity along the remote leg may send an indication that the voice call is in an alerting state, such as through sending an indication of a ring back tone, which may be received by the SCC-AS 114 at operation 402. Operation 402 may further comprise the SCC-AS 114 forwarding the ring back tone to the user device 102. Operation 404 may comprise the evolved packet core determining that an SR-VCC handover of the user device 102 is needed and then sending an SR-VCC HO Start message to the MSC 124. Operation 404 may further comprise the HCC controller 156 receiving the SR-VCC HO Start message and sending a second invite request message indicating handover of the user device 102 to the SCC-AS 114. The second invite request message may comprise a Session Transfer Number for SR-VCC (STN-SR). Operation 406 may then comprise the call continuity enabler 146 determining that the user device 102 is a party to a voice call in an alerting state updating the remote leg of the outgoing voice call in alerting state. Operation 406 may further comprise the HCC controller 156 sending an SR-VCC HO Command message to the evolved packet core 112, though it will be appreciated that the HCC controller 156 may not send this message concurrent with the call continuity enabler 146 updating the remote leg and may indeed occur at any point subsequent to the MSC 124 receiving the SR-VCC HO Start message.

The call continuity enabler 146 may then send a 200 OK message comprising session state information indicating that the user device 102 has an outgoing voice call in alerting state (e.g., "other alerting") to the MSC 124, at operation 408. This session state information may describe a session related to the first invite request message. Operation 408 may further comprise the evolved packet core 112 sending a handover command to the user device 102, though it will be appreciated that timing of sending the handover command may not be concurrent with transmission of the 200 OK message and may occur at any point in time following receipt of the SR-VCC HO Command by the evolved packet core 112. Operation 410 may comprise the HCC manager 136 of the user device 102 moving to the CS network 106 and creating the call state U4. Operation 410 may further comprise the HCC controller 156 of the MSC 124 creating the call state N4 based at least in part upon the session state information included in the 200 OK message.

The remote end may then answer the incoming voice call and operation 412 may comprise the SCC-AS 114 receiving a 200 OK message for the first invite request message from the remote leg of the voice call. Operation 412 may further comprise the call continuity enabler 146 sending a notification message indicating the remote end answered the call to the MSC 124 and the MSC 124 may in turn send a CONNECT message indicating that the call was answered to the user device 102. The user device 102 may then send a CONNECT ACKNOWLEDGEMENT (ACK) in response to the CONNECT message to the MSC 124, at operation 414. Operation 416 may then comprise the user device 102 creating the active state U10 and the MSC 124 creating the active state N10 in response to the voice call being answered.

FIG. 5 illustrates a flowchart according to an exemplary method for voice call continuity in intersystem handover according to an exemplary embodiment of the invention. In this regard, FIG. 5 illustrates operations that may occur at a network entity (e.g., an SCC-AS 114) of a packet switched network. The method may include the call continuity enabler 146 receiving an invite request message sent by a network entity on a CS network, such as the MSC 124 on the CS network 106, indicating that the user device 102 is being handed over from a PS network (e.g., the PS network 104) to the CS network, at operation 500. Operation 510 may comprise the call continuity enabler 146 determining that the user device 102 is a party to a voice call in an alerting state. The call continuity enabler 146 may then provide session state information indicating that the user device is a party to a voice call in an alerting state to the network entity on the CS network, at operation 520. Operation 530 may then comprise the call continuity enabler 146 receiving a notification message indicating disposition of the voice call (e.g., whether the voice call was answered or rejected). If the voice call was an incoming voice call, the notification message may have been sent by the network entity on the circuit switched network. Alternatively, if the voice call was an outgoing call, the notification message may have been sent from a remote end of the voice call (e.g., a network entity in the direction of the originator of the voice call). Operation 540 may then comprise the call continuity enabler 146 notifying of disposition of the call in response to receipt of the notification message. In this regard, operation 540 may comprise the call continuity enabler 146 sending notification of whether an incoming voice call was answered or rejected toward the remote end of the voice call. Alternatively, operation 540 may comprise the call continuity enabler 146 sending notification of whether an outgoing voice call was answered or rejected to the network entity on the CS network.

FIG. 6 illustrates a flowchart according to an exemplary method for voice call continuity in intersystem handover according to an exemplary embodiment of the invention. In this regard, FIG. 6 illustrates operations that may occur at a network entity (e.g., an MSC 124) of a circuit switched network (e.g., the CS network 106). The method may include the HCC controller 156 sending an invite request message indicating that the user device 102 is being handed over from a PS network (e.g., the PS network 104) to the CS network to a network entity on the PS network, such as the SCC-AS 114 on the PS network, at operation 600. Operation 610 may comprise the HCC controller 156 receiving session state information indicating that the user device is a party to a voice call in an alerting state. The session state information may be provided by the network entity on the PS network. The HCC controller 156 may then create a corresponding CS call control state based at least in part upon the received session state information, at operation 620. Operation 630 may then comprise the HCC controller 156 receiving a notification message indicating disposition of the voice call (e.g., whether the voice call was answered or rejected). If the voice call was an incoming voice call, the notification message may have been sent by user device 102. Alternatively, if the voice call was an outgoing call, the notification message may have been sent by the network entity on the PS network. Operation 640 may then comprise the HCC controller 156 notifying of disposition of the call in response to receipt of the notification message. In this regard, operation 640 may comprise the HCC controller 156 sending notification of whether an incoming voice call was answered or rejected to the network entity on the PS network. Alternatively, operation 640 may comprise HCC controller 156 sending notification of whether an outgoing voice call was answered or rejected to the user device 102.

FIG. 7 illustrates a flowchart according to an exemplary method for voice call continuity in intersystem handover according to an exemplary embodiment of the invention. In this regard, FIG. 7 illustrates operations that may occur at a user device 102. The method may include the HCC manager 136 receiving a handover command for a single radio voice call continuity handover of the user device 102, from a packet switched network to a circuit switched network while the user device 102 is a party to a voice call in an alerting state, at operation 700. The handover command may be sent by the evolved packet core 112. Operation 710 may comprise the HCC manager 136 determining, in response to receipt of the handover command, a current packet switched call control state related to the voice call in an alerting state. The HCC manager 136 may then create a corresponding circuit switched call control state based at least in part upon the determined current packet switched call control state, at operation 720.

FIGS. 5-7 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, computing device users, and network service providers. Embodiments of the invention provide for SR-VCC in an intersystem handover of a user equipment device that is a party to a voice call in the alerting state. In this regard, embodiments of the invention provide for detection that a user equipment device is a party to an alerting state voice call at a network entity of a packet switched network when the user equipment device is handed over from the packet switched network to a circuit switched network. Embodiments of the invention further provide for the network entity of the packet switched network to provide notification to a network entity of the circuit switched network of the voice call in the alerting state so that the network entity of the circuit switched network is enabled to create an appropriate circuit switched call state. In this regard, embodiments of the invention provide for SR-VCC in an intersystem handover of a user equipment device that is a party to a voice call in the alerting state such that the voice call is not dropped as a result of the handover.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining, by a service centralization and continuity application server, that a user equipment being handed over from a packet switched network to a circuit switched network is a party to a voice call in an alerting state, wherein the alerting state represents a ringing state; and
   providing, by the service centralization and continuity application server, session state information to a network entity on the circuit switched network, wherein the session state information indicates that the user equipment is in an alerting state, wherein the providing is in response to the determining.

2. The method of claim 1, further comprising:
   receiving, at the service centralization and continuity application server, an invite request message sent by the network entity on the circuit switched network, wherein the invite request message comprises an indication that the user equipment is being handed over from the packet switched network to the circuit switched network; and
   wherein determining that the user equipment is a party to a voice call in an alerting state is performed in response to receipt of the invite request message.

3. The method of claim 1, wherein:
   determining that the user equipment being handed over from a packet switched network to a circuit switched network is a party to a voice call in an alerting state comprises determining that the user equipment has an incoming or outgoing voice call in an alerting state; and
   providing session state information comprises providing session state information indicating that the user equipment has an incoming or outgoing voice call in an alerting state to the network entity on the circuit switched network in response to the determination.

4. A non-transitory computer-readable storage medium including computer program code which when executed by at least one processor provides operations comprising:
   determining, by a service centralization and continuity application server, that a user equipment being handed over from a packet switched network to a circuit switched network is a party to a voice call in an alerting state, wherein the alerting state represents a ringing state; and
   causing, by the service centralization and continuity application server, session state information to be provided to a network entity on the circuit switched network, wherein the session state information indicates that the user equipment is in an alerting state, wherein the causing is in response to the determining.

5. An apparatus, comprising:
   at least one processor; and
   at least one memory including computer program code, the at least one memory and computer program code configured to, with the at least one processor, cause the apparatus to perform at least the following:
   determine, by a service centralization and continuity application server, that a user equipment being handed over from a packet switched network to a circuit switched network is a party to a voice call in an alerting state, wherein the alerting state represents a ringing state; and
   provide, by the service centralization and continuity application server, session state information to a network entity on the circuit switched network, wherein the session state information indicates that the user equipment is in an alerting state, wherein the providing is in response to the determining.

6. The apparatus of claim 5, wherein the memory and computer program code are configured to, with the at least one processor, further cause the apparatus to:
   receive, at the service centralization and continuity application server, an invite request message sent by the network entity on the circuit switched network indicating that the user equipment is being handed over from the packet switched network to the circuit switched network; and
   wherein the memory and computer program code are configured to, with the at least one processor, further cause the apparatus to determine that the user equipment is a party to a voice call in an alerting state is in response to receipt of the invite request message.

7. The apparatus of claim 5, wherein the memory and computer program code are configured to, with the at least one processor, further cause the apparatus to:
   determine, by the service centralization and continuity application server, that the user equipment being handed over from a packet switched network to a circuit switched network is a party to a voice call in an alerting state by determining that the user equipment has an incoming or outgoing voice call in an alerting state; and
   provide, by the service centralization and continuity application server, session state information by providing session state information indicating that the user equipment has an incoming or outgoing voice call in an alerting state to the network entity on the circuit switched network in response to the determination.

8. The apparatus of claim 7, wherein the apparatus is further configured to at least:
   receive, at the service centralization and continuity application server, a notification message sent by the network entity on the circuit switched network indicating whether the user equipment answered or rejected the incoming voice call; and
   send, by the service centralization and continuity application server, notification of whether the user equipment answered or rejected the incoming voice call toward a remote end of the voice call, wherein the notification is based at least in part upon the received notification message.

9. The apparatus of claim 7, wherein the apparatus is further configured to at least:

receive, at the service centralization and continuity application server, a notification message sent from a remote end of the voice call indicating whether the outgoing voice call was answered or rejected; and send, by the service centralization and continuity application server, notification of whether the outgoing voice call was answered or rejected to the network entity on the circuit switched network, wherein the notification is based at least in part upon the received notification message.

* * * * *